United States Patent [19]

Overbay

[11] Patent Number: 4,679,315
[45] Date of Patent: Jul. 14, 1987

[54] HYDRAULIC TUBE PLUG REMOVER

[75] Inventor: Mark A. Overbay, East Ridge, Tenn.

[73] Assignee: Combustion Engineering, Inc., Windsor, Conn.

[21] Appl. No.: 816,601

[22] Filed: Jan. 6, 1986

[51] Int. Cl.$^4$ .............................................. B23P 15/26
[52] U.S. Cl. ........................................ 29/726; 29/252; 29/282; 29/400 N; 29/426.5; 376/463
[58] Field of Search ...................... 29/426.5, 726, 235, 29/252, 282, 400 N; 376/463

[56] References Cited

U.S. PATENT DOCUMENTS 3,791,011 2/1974 Keys .............................. 29/726 X
4,366,617 1/1983 Nanstiel et al. ................. 29/252 X Primary Examiner—Howard N. Goldberg
Assistant Examiner—Ronald S. Wallace
Attorney, Agent, or Firm—John H. Mulholland

[57] ABSTRACT

A hydraulic actuator (26) for removing a plug (14) from a tube (12) including tube gripping means (28, 32), the actuator having a double piston arrangement (38, 52), which when energized quickly and efficiently first causes the gripping means to positively grip the plug, and then thereafter remove the plug from the tube, all in one continuous motion.

3 Claims, 1 Drawing Figure

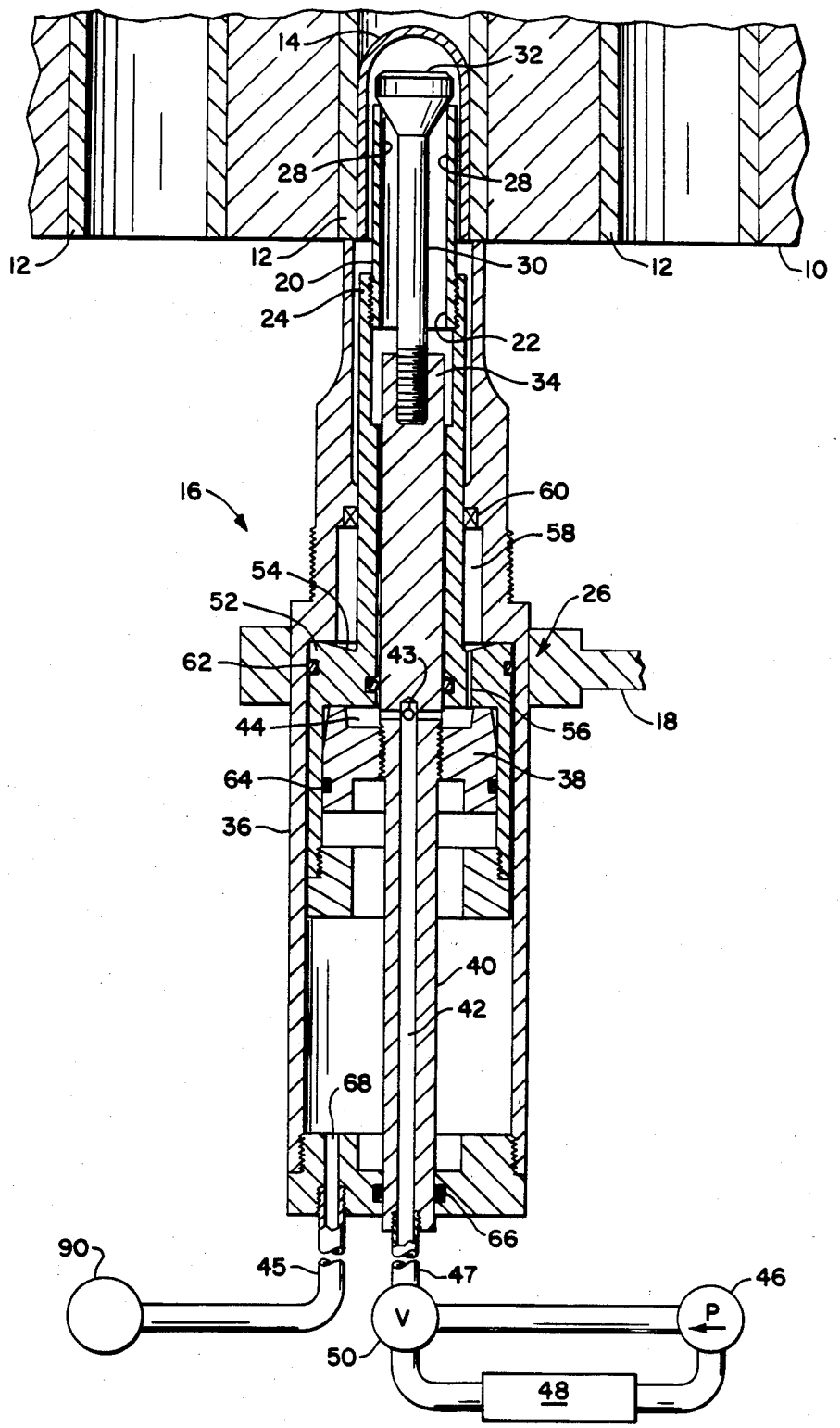

HYDRAULIC TUBE PLUG REMOVER

BACKGROUND OF THE INVENTION

In tube and sheet heat exchangers, for example those used in a nuclear steam generator, problems are encountered in the form of tubes which become defective or damaged. In the past, these tubes were removed from operation by welding plugs into each end during a maintenance shutdown, and thereafter continuing the later operation of the steam generator with reduced capacity with the remaining tubes in operation. This form of maintenance is satisfactory until so many of the tubes are plugged as to make it economically unfeasible to continue operation at the reduced capacity. Thus, instead of doing the above, the tubes are presently plugged by plugs that can be removed at a later time. These plugs are mechanically expanded into the tubes without any welding being done. When too many tubes have been removed from operation, the unit is shutdown, the plugs are removed and the tubes are inspected and tested to see which of the defective tubes can be effectively repaired, for example by sleeving. If enough tubes can be repaired, the useful life of the steam generator can be greatly extended. The plugs are generally loosened by means of a tool which spirals an electrical arc along the inside surface of the plug wall. As the arc melts a portion of its inner surface, the forces of solidification cause the wall of the plug to contract or shrink back, close to the original size that it was before it was expanded into the defective tube. A gripping mechanism is then used for pulling the plug from the tube end. Care must be taken during this action so as not to cause damage to the tubes.

SUMMARY OF THE INVENTION

In accordance with the invention, there is provided a hydraulic actuator for a plug gripping member which causes positive gripping and pulling of a prepared tube plug in one rapid, reliable step or motion. The actuator utilizes a double piston arrangement capable of exerting a large force, so as to quickly and efficiently remove all plugs even those that for some reason are tightly secured in a tube.

BRIEF DESCRIPTION OF THE DRAWING

The FIGURE is a sectional side view of a tube plug remover incorporating the hydraulic actuator of the invention.

DESCRIPTION OF THE PREFERRED EMBODIMENT

Looking now to the drawing, a tube sheet 10 of a nuclear steam generator is partially shown, which has a plurality of tubes 12 secured thereto. One of the tubes 12 has a plug 14 therein, which had been placed in the tube to effectively remove it from operation. The plug had been mechanically expanded into the tube during a shutdown of the unit. At a later time during another shutdown period, the plug was initially loosened in the tube, for example by using a welding electrode to heat the inside of the plug, causing it to shrink back to close to its original size. The means used for initially loosening the plug forms no part of the present invention, and any suitable means could be used.

The hydraulic plug remover 16 is carried by an articulated arm 18 which can accurately position the tool with respect to the tube whose plug is to be removed. The plug remover consist of a gripper member 20, having a cylindrical threaded portion 22, which is threaded into member 24 on the actuator member 26. Extending up into the tube plug 14 are a plurality of fingers 28, there being eight such fingers preferably. Extending up through a central cavity within the fingers is a shaft 30, having an enlarged expanding member 32 on the end thereof. The other end of shaft 30 is threadedly connected to shaft 34 of the hydraulic actuator 26. As will be explained in more detail later, when the expanding member 32 is moved downwardly with respect to the finger 28, it forces the fingers 28 outwardly, into tight engagement in the inner walls of the plug 14. After this has been accomplished, downwardly movement of the entire gripper tool, including the fingers 28 and the expanding member 32, causes the plug 14 to be withdrawn or removed from the tube 12.

The hydraulic actuator 26 will now be explained. Contained within housing 36 is a first piston 38. This piston is attached to shaft 34. Also, attached to the piston is a second shaft 40 having a passageway 42 extending therethrough, which terminates at its upper end in a plurality of horizontal passages 43, which are in fluid communication with chamber 44. The other end of passageway 42 is fluidly connected to a source of pressurized fluid, such as pump 46 and also a fluid reservoir 48 through a flexible hose 47 and a 4-way valve 50.

A second piston 52 is attached to the member 24 at its upper end, and is used to move the gripper assembly downward to remove the plug 14 from the tube. Chamber 54 located on the upper side of piston 52, is supplied with pressurized fluid through restricted or bleed passage 56. A bronze bearing 58 is located above the chamber 54. Also, a plurality of seals 60, 62, 64 and 66 prevent fluid leakage out of either end of the housing or across either of the pistons 38 or 52. A passage 68 in the lower end of the housing is fluidly connected to the pump 46 and reservoir 48 through a flexible hose 47 and the 4-way valve 50.

The operation of the plug remover will now be explained. The articulated arm 18 initially brings the tool into proper alignment with the plugged tube 12, with the gripper assembly 28, 32 positioned within the plug 14 which is to be removed. The upper end of the housing 36 abuts against the end of the tube 12. Once the tool properly positioned, the operator actuates the 4-way valve 50 such that pressurized fluid flows into chamber 44 via conduit 47, passageway 42 and passages 43. Piston 38 moves downward, causing the expander member 32 to do so likewise, springing fingers 28 outward, into tight engagement with the inner wall surface of the plug 14.

Fluid from chamber 44 flows through the bleed passageway 56 into the second chamber 54, forcing piston 52 downwardly. This pulls the entire gripper assembly 28, 32 along with the engaged plug 14 in a downward direction. The pump 46 is capable of developing a large pressure, for example 1,000–10,000 pounds, so that even if the plug is fairly well secured in the tube, the large pressure exerted on piston 52 will free it and allow it to be removed.

After the plug has been removed, the operator reverses the position of the 4-way valve 50, connecting conduit 47 to the reservoir 48. The pneumatic pressure line 45, which is connected to a low, constant pressure source 90, resets the tool actuator, so that it is ready for removal of another plug.

I claim:

1. In combination, a tube, a plug in the end of the tube, plug removal means including a shaft having an enlarged first end extending up into the plug, expandable means surrounding the enlarged end, such that when the shaft is removed axially outwardly of the plug and the expandable means, it forces the expandable means radially outwardly into tight engagement with plug, a plug removal means actuator including a first member having a first end attached to the shaft, and second end attached to a first piston, a second member having a first end attached to the expandable means and a second end attached to a second piston, a first chamber having one wall thereof, formed by the first piston, a second chamber having one wall thereof formed by the second piston, a source of pressurized fluid, a first passage connecting the source of pressurized fluid with the first chamber, a restricted second passage connecting the first chamber to the second chamber, such that when the source of pressurized fluid is initially connected to the first chamber, the enlarged first end of the shaft is immediately moved axially outwardly of the plug and the expandable means, causing the expandable means move radially outwardly into right engagement with the plug, and as more pressurized fluid enters the first chamber and the second chamber, both and the first and second pistons move to pull the plug removal means and the plug out of the tube.

2. The combination set forth in claim 1, wherein the restricted passage is located in the second piston.

3. The combination set forth in claim 2, including valve means located in the first passage.

* * * * *